R. E. HELLMUND.
CONTROL SYSTEM.
APPLICATION FILED OCT. 6, 1915.
1,283,176.
Patented Oct. 29, 1918.
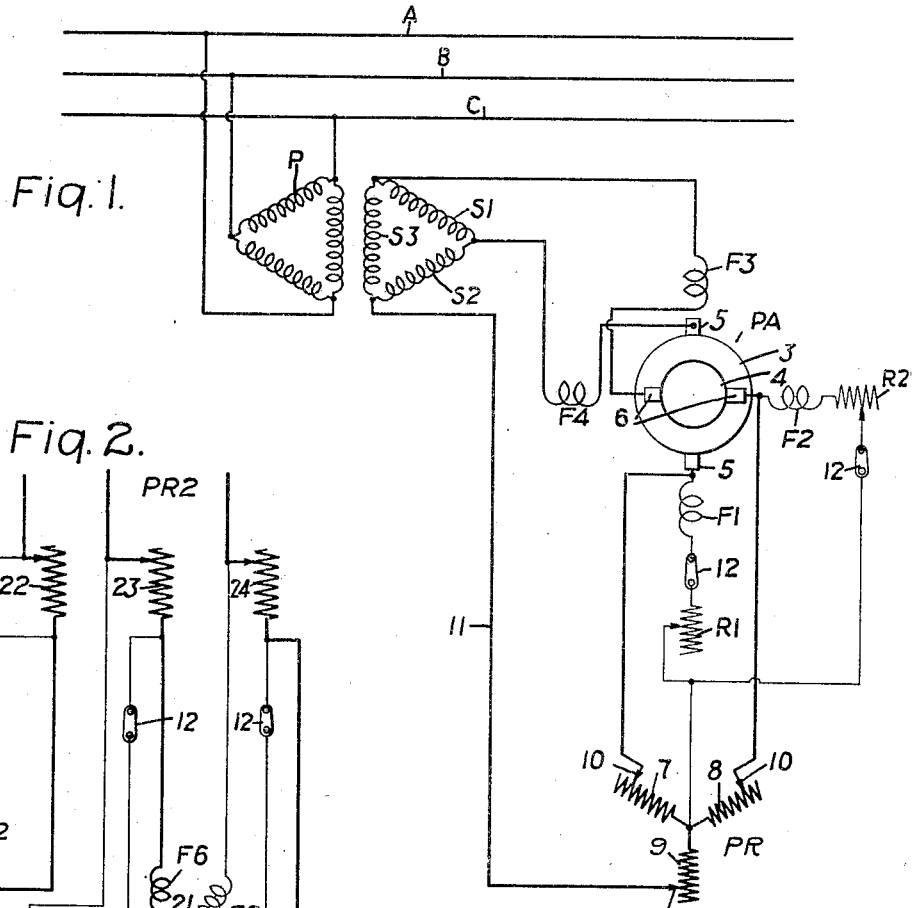
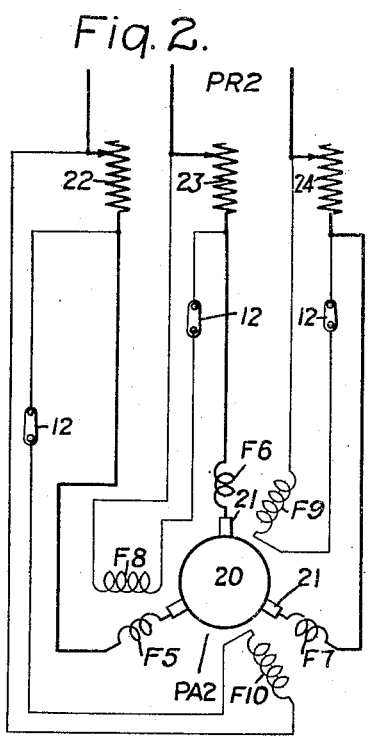
WITNESSES:
INVENTOR
Rudolf E. Hellmund
BY
ATTORNEY

UNITED STATES PATENT OFFICE.

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

CONTROL SYSTEM.

1,283,176. Specification of Letters Patent. Patented Oct. 29, 1918.

Application filed October 6, 1915. Serial No. 54,337.

*To all whom it may concern:*

Be it known that I, RUDOLF E. HELLMUND, a subject of the German Empire, and a resident of Pittsburgh, in the county of Allegheny and State of Pennsylvania, have invented a new and useful Improvement in Control Systems, of which the following is a specification.

My invention relates to systems of control, and it has special reference to the phase regulation of polyphase induction motors and systems of distribution.

The object of my invention is to provide a system of the above-indicated character which shall be relatively simple and inexpensive in construction and effective and reliable in operation and which shall be adapted to automatically vary the regulating effect of a phase-advancer in accordance with the slip of the induction motor to be governed.

It is well-known to those skilled in the art that, in order to obtain approximately correct compensation of the power-factor of an induction motor by the use of a phase-advancer, the voltage induced in the advancer should vary substantially directly in accordance with the slip of the induction motor; that is to say, approximately in proportion to the frequency of alternations in the secondary winding of the motor.

According to my present invention, I accomplish the end in view by providing a phase-advancer that is connected in circuit intermediate the secondary winding of the induction motor to be governed and a polyphase translating device or resistor that is employed for purposes of speed regulation of the motor, in accordance with a familiar practice. The phase-advancer is provided with a plurality of field-magnet windings that are disposed in quadrature relation, the one to the other, and are respectively connected in parallel relation to certain portions of the regulating resistor. To magnetize the field windings approximately in phase with the flux created by the armature, it is necessary to provide the field windings with an ohmic resistance that bears a relatively high ratio to the inductance thereof. In this way, the phase-regulating effect of the advancer varies substantially directly with the variation in slip of the induction motor, inasmuch as the field-magnet windings referred to are energized in proportion to the active values of the respective sections of the regulating resistor in question.

In the accompanying drawing, Figure 1 is a diagrammatic view of a system of control embodying my invention; and Fig. 2 is a similar partial view of a modification thereof.

Referring to the drawing, the system here shown comprises a three-phase supply circuit having phase conductors A, B and C; an induction motor comprising a suitable stationary primary winding P and a coöperating secondary rotor winding having sections $S^1$, $S^2$ and $S^3$; a phase-advancer PA for regulating the operation of the induction motor; and a suitable translating device, such as a polyphase resistor PR, that is dynamically associated with the secondary motor winding and the phase-advancer PA in a manner to be described. By "dynamically associated", I mean so associated that energy transfer therebetween is possible.

While the primary and secondary motor windings are here shown as delta-connected, it will be understood that any other well-known arrangement of the induction motor windings may be employed in connection with my invention, if desired.

The phase-advancer PA is, in general, of the well-known Leblanc type, as modified in my co-pending application, Serial No. 49,754, filed September 9, 1915, comprising a pair of independent armature windings (not shown) that are respectively connected to a plurality of commutating cylinders 3 and 4 in the usual manner; a set of brushes 5 that coöperate with the commutator cylinder 3; a second set of brushes 6 that coöperate with the commutator cylinder 4 and are located in space quadrature relation to the first-mentioned set of brushes; and a plurality of stationary field-magnet windings $F^1$, $F^2$, $F^3$ and $F^4$ that are dynamically associated with the armature windings of the phase-advancer and with certain external circuits in a manner about to be described.

The polyphase resistor PR is here shown as of the interconnected type comprising a plurality of portions of sections 7, 8 and 9 that are connected in star relation. However, it will be understood that any other suitable type of resistor for governing the general speed regulation of the induction motor may be employed, if desired. Any suitable means for simultaneously varying the active portions of the several sections 7, 8 and 9 of the resistor may be utilized, a plurality of arrows 10 serving to indicate such means.

The field winding $F^1$ is connected, through a variable resistor $R^1$, in parallel relation to the active portion of the section 7 of the regulating resistor PR. In a similar manner, the field winding $F^2$ is connected, through a variable resistor $R^2$, in parallel relation to the active portion of the resistor section 8. The resistor section 9 is connected directly through a conductor 11 to the junction-point of the sections $S^2$ and $S^3$ of the secondary motor winding. The junction-point of the secondary windings $S^1$ and $S^3$ is connected through the field-magnet winding $F^3$ to the armature winding that is connected to the brushes 6, while the field-magnet winding $F^4$ is connected intermediate the armature winding that is connected to the brushes 5 and the junction-point of the secondary motor windings $S^1$ and $S^2$.

In order to magnetize the field windings $F^1$ and $F^2$ approximately in phase with the flux that is set up by the armature currents, such phase relations being desirable, as set forth in my above-identified co-pending application, the resistors $R^1$ and $R^2$ are employed primarily for the purpose of providing the circuits of the field-magnet windings mentioned with a relatively high ratio of ohmic resistance to inductance.

The operation of the system described may be briefly set forth as follows: Assuming that the accelerating speed of the induction motor is governed in a familiar manner by means of the switching devices 10 and the polyphase resistor PR, it will be observed that, as the active values of the resistor sections 7, 8 and 9 increase to correspondingly increase the slip of the induction motor and the frequency of the secondary winding circuit, the voltages impressed upon the field-magnet windings $F^1$ and $F^2$ of the phase-advancer are correspondingly increased, and the desired result of an augmented voltage induced in the phase-advancer armature windings, in accordance with the variation of motor slip, is automatically secured. When the resistor PR is short-circuited, the shunt circuits, including the field windings $F^1$ and $F^2$, are preferably opened by switches 12.

The field-magnet windings $F^3$ and $F^4$ may be omitted, if desired, inasmuch as they serve merely to induce a voltage in the phase-advancer armature windings in phase with the secondary motor currents for the purpose of regulating the slip, and the field-magnet windings $F^1$ and $F^2$ may be designed to alone properly effect the desired power-factor regulation, as the slip of the induction motor varies. Reference may be had to my co-pending application, Serial No. 49,755, filed September 9, 1915, for a fuller description of the field windings $F^3$ and $F^4$.

In some cases, it may be found that, since the magnetization of the field windings $F^1$ and $F^2$ are in phase with the corresponding armature magnetizing effects, as accurate phase adjustments as desired may not be obtained at times from the system shown in Fig. 1. In such instances, the type of phase-advancer $PA^2$ that is illustrated in Fig. 2 may be employed.

The phase-advancer $PA^2$ comprises a single armature winding (not shown) that is connected to a commutator cylinder 20, upon which bear a plurality of brushes 21 that are spaced 120° apart. A plurality of compensating field-magnet windings $F^5$, $F^6$ and $F^7$ are respectively connected in circuit with the secondary phase windings of the induction motor and with the brushes 21 to either partially or wholly neutralize, as desired, the magneto-motive force of the armature winding. A plurality of exciting field magnets $F^8$, $F^9$ and $F^{10}$ are mounted in electrical quadrature to the axes and commutating planes determined by the field windings $F^6$, $F^7$ and $F^5$, respectively. Thus, the armature-turns in electrical quadrature to the winding $F^6$, for example, have a quadrature-related leading E. M. F. induced therein by the field produced by the winding $F^8$, and a like relation holds with respect to the windings $F^7$ and $F^9$ and with respect to the windings $F^5$ and $F^{10}$. The connections are so arranged that the quadrature-related E. M. F.'s thus produced are applied in the proper phase windings to produce the desired improvement of the power factor.

In the system shown in Fig. 2, it is not necessary to provide the circuits of the exciting field windings $F^8$, $F^9$ and $F^{10}$ with a relatively high ratio of ohmic resistance to inductance, as was the case in the system illustrated in Fig. 1, since the position of the exciting windings and the employment of the compensating field windings, $F^5$, $F^6$ and $F^7$ produce the desired results. Any suitable polyphase governing resistor $PR^2$ may be utilized, and the several exciting field windings $F^8$, $F^9$ and $F^{10}$ are connected in parallel relation to the respective sections 22, 23 and 24 of the resistor $PR^2$, for the purpose already set forth.

It will be understood that the general operation of the system illustrated in Fig. 2 is similar to that of the system shown in Fig. 1, and no further exposition thereof is deemed necessary.

I do not wish to be restricted to the specific location and arrangement of control circuits herein set forth, as various modifications thereof may be effected without departing from the spirit and scope of my invention. I desire, therefore, that only such limitations shall be imposed as are indicated in the appended claims.

I claim as my invention:

1. The combination with a polyphase induction motor having a primary and a secondary winding, of a polyphase interconnected resistor dynamically associated with said secondary winding for regulating purposes, a phase-regulating dynamo-electric machine armature dynamically associated with the secondary winding and the resistor, and a plurality of field-magnet windings for the phase regulating machine respectively connected in parallel relation to portions of said resistor.

2. The combination with a polyphase induction motor having a primary and a secondary winding, of a three-phase resistor having its sections connected in star relation, a phase-regulating dynamo-electric machine armature for said secondary winding having two independent windings that are respectively connected in series relation with two sections of said resistor, means for connecting the remaining resistor section to the secondary winding, a plurality of field-magnet windings respectively connected in parallel relation to certain sections of said resistor, and means for varying the current traversing said field windings by predetermined amounts.

3. The combination with a polyphase induction motor having a primary and a secondary winding, of a polyphase multi-section translating device dynamically associated with said secondary winding for regulating purposes, a phase-advancing dynamo-electric machine having an armature dynamically associated with the secondary winding, and a plurality of field-magnet winding circuits for said phase-advancing machine severally having a relatively high ratio of ohmic resistance to inductance and respectively connect in parallel relation to certain sections of said translating device.

In testimony whereof I have hereunto subscribed my name this 30th day of Sept. 1915.

RUDOLF E. HELLMUND.

Copies of this patent may be obtained for five cents each, by addressing the "Commissioner of Patents, Washington, D. C."